US008792346B2

(12) United States Patent
Cristallo et al.

(10) Patent No.: US 8,792,346 B2
(45) Date of Patent: Jul. 29, 2014

(54) METHOD OF PERFORMING MULTICAST ADMISSION CONTROL IN A COMMUNICATIONS NETWORK, CENTRAL ADMISSION CONTROLLER AND COMMUNICATIONS NETWORK

(75) Inventors: Geoffrey Cristallo, Molenbeek (BE); Michel Van Ackere, Sint-Niklaas (BE)

(73) Assignee: Alcatel-Lucent, Boulogne-Billancourt (FR)

( * ) Notice: Subject to any disclaimer, the term of this patent is extended or adjusted under 35 U.S.C. 154(b) by 172 days.

(21) Appl. No.: 12/133,126

(22) Filed: Jun. 4, 2008

(65) Prior Publication Data

US 2008/0310413 A1 Dec. 18, 2008

(30) Foreign Application Priority Data

Jun. 12, 2007 (EP) .................................... 07290738

(51) Int. Cl.

*H04J 1/16* (2006.01)
*H04L 12/54* (2013.01)
*H04L 12/56* (2006.01)
*H04L 12/24* (2006.01)

(52) U.S. Cl.

CPC ............. *H04L 12/5695* (2013.01); *H04L 47/10* (2013.01); *H04L 41/0896* (2013.01)
USPC ........... 370/231; 370/329; 709/227; 709/228; 709/229

(58) Field of Classification Search

CPC ..... H04L 47/10; H04L 12/5695; H04L 47/22; H04L 47/2408; H04L 47/2433; H04L 47/2441; H04L 41/0896
USPC ......................... 370/230, 235, 254, 312, 329; 709/227–229
See application file for complete search history.

(56) References Cited

U.S. PATENT DOCUMENTS 7,245,614 B1 * 7/2007 Podar et al. ................... 370/389
7,277,402 B2 * 10/2007 Legallais et al. .............. 370/260

(Continued)

OTHER PUBLICATIONS

Andrea Borella et al., Implementation schemes for multicast bandwidth brokers in multidomain networks, Computer Networks, Elsevier Science Publishers B.V., Amsterdam, Netherland, vol. 37, No. 5, Nov. 22, 2001, pp. 519-540.*

(Continued)

*Primary Examiner* — Mark Rinehart
*Assistant Examiner* — Mang Yeung
(74) *Attorney, Agent, or Firm* — Harness, Dickey & Pierce

(57) ABSTRACT

The invention relates to a method of performing multicast admission control in a communications network (1'), comprising the steps of: a) receiving, at a first node (1-1) of the communications network (1'), a request (6) for a multicast channel (4*b*) from a host system (5*b*) communicatively coupled to the first node (1-1); b) sending, by the first node (1-1), a request (6) for the multicast channel (4*b*) to a central admission controller (7) of the communications network (1'), the sending of the request (6) being triggered by receiving the request (6) from the host system (5*b*); c) determining, by the central admission controller (7), if sufficient resources exist on nodes (1-1 to 3-1) and interconnecting links (1.1 to 3.1, T2) of the communications network (1') to provide the requested multicast channel (4*b*) from a source (3) to the host system (5*b*); and d) in case that sufficient resources exist, installing on the nodes (1-1 to 3-1) having sufficient resources to provide the requested multicast channel (4*b*) to the host system (5*b*), a replication rule for the multicast channel (4*b*). The invention further relates to a central admission controller (7) and to a communications network (1').

8 Claims, 2 Drawing Sheets

(56) References Cited

U.S. PATENT DOCUMENTS

| | | | | |
|---|---|---|---|---|
| 2004/0151134 | A1* | 8/2004 | Bohm | 370/321 |
| 2005/0044142 | A1* | 2/2005 | Garrec et al. | 709/204 |
| 2007/0121629 | A1* | 5/2007 | Cuijpers et al. | 370/390 |

OTHER PUBLICATIONS

Borella et al, "Implementation schemes for multicast bandwidth brokers in multidomain networks", Computer Networks, Elsevier Science Publishers B.V, Amsterdam, Netherlands, vol. 37, No. 5, Nov. 22, 2001, pp. 519-540 XP004311259.

ETSI: "draft ETSI TS 182 019 (vO.5.2) Telecommunications and Internet Converged Services and Protocols for Advanced Networking (TISPAN); Resource and Admission Control Sub-system (RACS); Functional Architecture; Release 2", ETSI, Apr. 2007, XP014037071.

* cited by examiner

METHOD OF PERFORMING MULTICAST ADMISSION CONTROL IN A COMMUNICATIONS NETWORK, CENTRAL ADMISSION CONTROLLER AND COMMUNICATIONS NETWORK

BACKGROUND OF THE INVENTION

The invention is based on the priority application EP07290738.9 which is hereby incorporated by reference.

The invention relates to a method of performing multicast admission control in a communications network, to a central admission controller for performing multicast admission control in a communications network, and to a communications network comprising such a central admission controller.

For illustrating current practice of multicast admission control, a simplified representation of a portion of a communications network 1 comprising a multicast tree 2 is shown in FIG. 1*a*. The multicast tree 2 has a source 3 for providing a plurality of services, e.g. voice over IP, Broadcast TV, or Video on Demand (VoD), over a first and second multicast channel 4*a*, 4*b* (represented as a sequence of arrows) to a plurality of host systems, a first and second of which 5*a*, 5*b* are shown in FIG. 1*a*. The first multicast channel 4*a* is established between the source 3 and the first host system 5*a* by replicating the first multicast channel 4*a* at each of three replication nodes 1-1 to 3-1 connecting the source 3 to the first host system 5*a* over corresponding interconnecting links 1.1 to 3.1, T1. The first multicast channel 4*a* is also established on two further nodes 1-2, 2-2 being connected to the second and third nodes 2-1 and 3-1, respectively. The second multicast channel 4*b* is established between the source 3, the third node 3-1 and the second of the further nodes 2-2.

For establishing the second multicast channel 4*b* as a new multicast channel between the second host system 5*b* and the source 3, the second host system 5*b* generates a request 6 for a multicast channel which is transmitted to the first node 1-1 in the multicast tree 2 over a corresponding interconnecting link T2, the request being e.g. of the IGMP (Internet Group Management Protocol) type.

As the requested channel is not yet available at the first node 1-1, the first node 1-1 performs Local Admission Control, i.e. it checks local resources, and typically, the downstream interconnecting link T2 to the second host system 5*b*. If the Local Admission Control at the first node 1-1 succeeds, the first node 1-1 forwards the request 6 for a new multicast channel to the second node 2-1, being the upper node in the multicast tree 2. The same procedure is repeated by the second node 2-1 and the third node 3-1.

The problem with the algorithm illustrated in FIG. 1*a* is that the total time it takes is a function of the number of IGMP hops from multicast node to multicast node in the multicast tree. As the number of hops increases, the time to perform the Local Admission Control on all replication nodes in the multicast tree also increases. Depending on the business success of Multicast Traffic (such as Broadcast TV), the number of multicast channels and the number of end users may increase in the near future. As a consequence, the probability that a given channel is available at a given node in the multicast tree will decrease. In other terms, the number of IGMP hops on which Local Admission Control needs to be performed will increase, thus the total time to perform the Multicast Admission Control will also increase.

Furthermore, in the algorithm illustrated in FIG. 1*a*, in case an upper node in the multicast tree 2 is unable to add the new multicast channel, the request 6 for a new multicast channel anyway has to cross several hops before the request is eventually denied, as illustrated in FIG. 1*b*: the Local Admission Control fails at the third node 3-1 (see the cross in FIG. 1*b*), but the request 6 nevertheless needs to cross the first node 1-1 and the second node 2-1 and Local Admission Control needs to be performed on all of the three nodes 1-1 to 3-1.

From US 2007/0081459 A1, a module for negotiating multi-service admission control is known which distributes the admission process for multicast channels between a centralized decision function and a distributed, i.e. local admission function. The local admission function can be established in replication nodes of a communications network, allowing the multicast replication nodes to participate in the admission control process.

SUMMARY OF THE INVENTION

It is the object of the invention to provide a method for performing multicast admission control in a communications network, to provide a central admission controller for performing multicast admission control, and to provide a communications network comprising such a central admission controller, all of which allow multicast admission control which can be performed more rapidly, and, in particular, with immediate detection of potential problems.

This object is achieved by a method comprising the steps of: a) receiving, at a first node of the communications network, a request for a multicast channel from a host system communicatively coupled to the first node; b) sending, by the first node, a request for the multicast channel to a central admission controller of the communications network, the sending of the request being triggered by receiving the request from the host system; c) determining, by the central admission controller, if sufficient resources exist on nodes and interconnecting links of the communications network to provide the requested multicast channel from a source to the host system; and d) in case that sufficient resources exist, installing on the nodes having sufficient resources to provide the requested multicast channel to the host system, a replication rule for the multicast channel.

In the solution proposed above, the first node in the multicast tree that receives the request for a new multicast channel delegates admission control to a central admission controller. This may be done by simply forwarding the request received from the host system to the central admission controller. Alternatively, the node may generate a new request being triggered by the request from the host system, the new request e.g. being of a protocol type which is different from the one it has received. In particular, a specific protocol type for communicating with the central admission controller may be used.

The central admission controller performs admission control over all interconnecting links and nodes in the multicast tree: it has a global view of the multicast tree and is aware of the distribution of the multicast channels. In this way, the central admission controller is able to detect possible congestion with a single check. If the central admission control succeeds, the central admission controller installs the new rule for channel replication in the appropriate nodes in the multicast tree.

In a preferred variant, step c) includes determining the nodes and interconnecting links in the communications network on which the requested multicast channel has to be established. In this case, the central admission controller first determines those multicast nodes and interconnecting links upon which the new channel needs to be established before determining if the new channel can be established on these nodes and interconnecting links, taking into account their available resources and limitations.

In a highly preferred variant, the replication rule for the requested multicast channel is installed in parallel on the nodes, so as to speed up the process of multicast admission control.

In another highly preferred variant, the method further comprises the step of transmitting a denial of service message from the central admission controller to the first node in case that in step c) it is determined that existing resources are insufficient. The central admission controller is able to detect potential problems which can be reported immediately to the end user of the host system requesting the new multicast channel. There is no need to propagate the request for the new multicast channel from node to node in the multicast tree.

In a further variant, the host system generates a request for a multicast channel, in particular an IGMP request, to be received by the first node. Also, other protocols such as the PIM (protocol independent multicast) family of protocols may be used by the host system.

The invention is also realized in a central admission controller for performing multicast admission control in a communications network, comprising: receiving means for receiving a request for a multicast channel sent from a first node of the communications network, resource determining means for determining if sufficient resources exist on nodes and interconnecting links of the communications network to provide the requested multicast channel from a source to a host system communicatively coupled to the first node, and replication rule installation means for installing a replication rule for the multicast channel on the nodes having sufficient resources to provide the requested multicast channel to the host system. The central admission controller has full knowledge of the resources both of the interconnecting links and the nodes of the multicast tree. For any given node of the multicast tree, the maximum number of multicast channels the node can handle, any local limitation, etc. is known to the central admission controller. The central admission controller also has knowledge, for each interconnecting link of the multicast tree, of the maximum number of multicast channels that can be transmitted over that link.

In a highly preferred embodiment, the replication rule installation means are construed for parallel installation of the replication rule on the nodes, thus establishing the new multicast channel more rapidly.

In a further preferred embodiment, the resource determining means are construed to determine the nodes and interconnecting links in the communications network on which the requested multicast channel has to be established. The nodes and interconnecting links which may be used for establishing the new multicast channel between the source and the host system should be determined by the resource determining means before a check if sufficient resources exist on that specific nodes and interconnecting links can be made.

In a highly preferred embodiment, the central admission controller further comprises a denial of service generating means for generating a denial of service message to be sent to the first node in case that the resource determining means determines that existing resources are insufficient. The denial of service message is sent from the central admission controller to the host system vial the first node, such that there is no need to propagate the request for the new multicast channel from multicast node to multicast node.

The invention is further realized in a communications network, comprising: a source for providing a number of services, a plurality of nodes and interconnecting links distributed between the source and a host system communicatively coupled to a first node of the communications network, and a central admission controller as described above for performing multicast admission control in the communications network. The communications network having a central admission controller can use the admission control process as described above, enhancing the Quality of Service (QoS) of the network. In a network access provider network, a session resource broker (SRB) may serve as a central admission controller for performing the admission control function as described above.

Further characteristics and advantages of the invention are provided in the following description of exemplary embodiments of the invention, with reference to the figures of the drawing, which shows details that are significant in the context of the invention, and in the claims. The individual characteristics can be implemented individually by themselves, or several of them can be implemented in any desired combination in a variant of the invention.

Figure 1A:
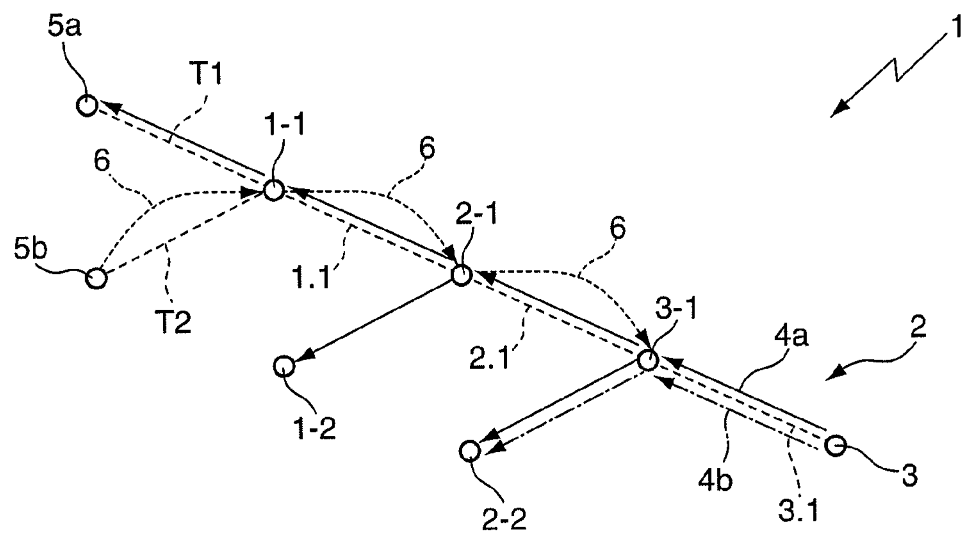
FIGS. 1*a,b* show a communications network with a multicast tree for illustration of a session admission control method according to the state of the art, and FIGS. 2*a,b* show an embodiment of a communications network according to the invention comprising a central admission controller according to the invention.
Figure 1B:
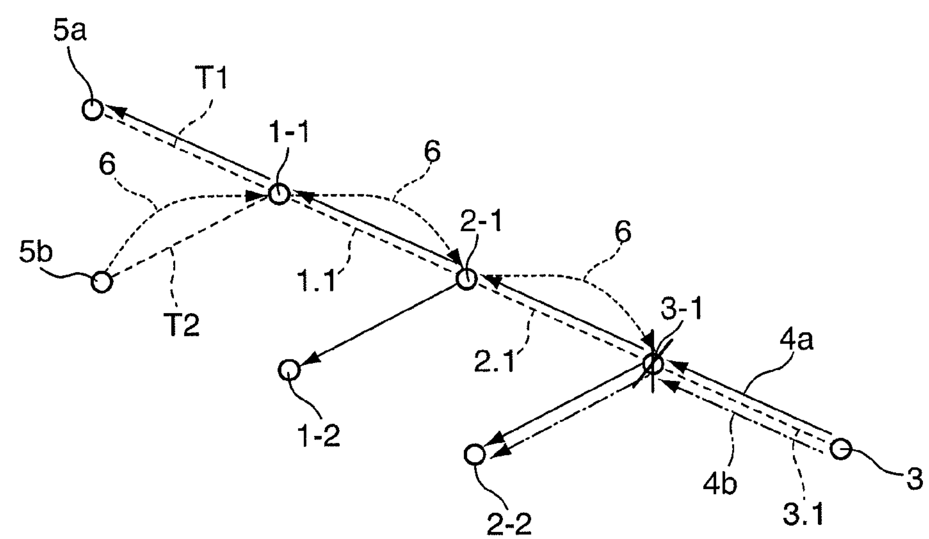
Figure 2A:
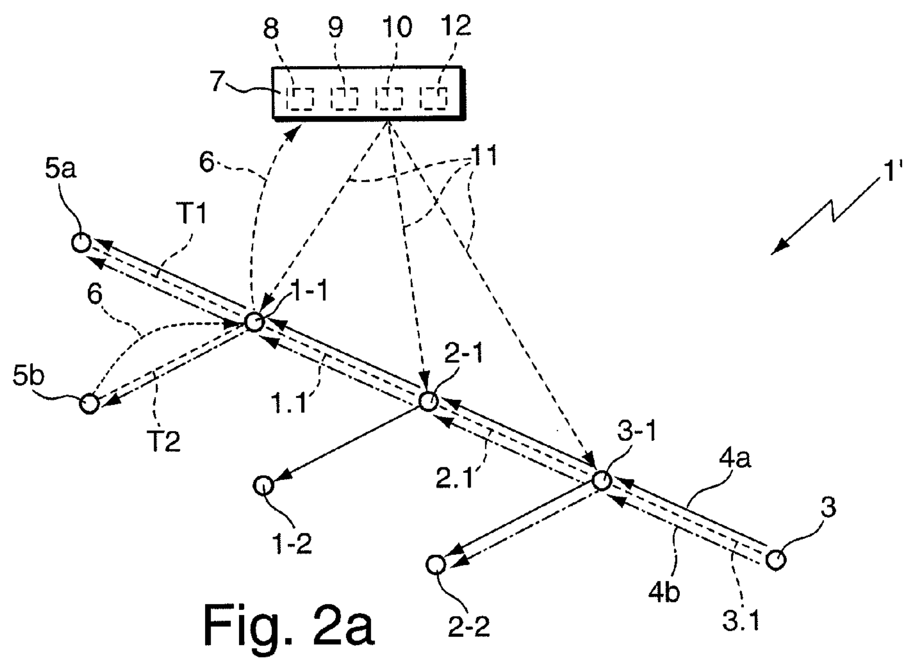

In the following, an admission control process for a new multicast channel will be described with reference to FIG. 2*a*, representing a communications network 1' comprising the multicast tree 2 as described above with reference to FIGS. 1*a,b*. For establishing a new multicast channel between the source 3 and the second host system 5*b* of the multicast tree 2, the second host system 5*b* generates a request 6 for a new multicast channel of the IGMP type. The person skilled in the art will appreciate that for this purpose other protocol types, e.g. of the PIM family, may be used as well.

The request 6 is received at the first node 1-1 of the multicast tree 2 and is forwarded to a central admission controller 7. Instead of forwarding the request 6, the first node 1-1 may generate a new request e.g. being of a different protocol type and send the new request to the central admission controller 7. In this way, a specific communication protocol type for communicating between the node 1-1 and the central admission controller 7 may be used.

The central admission controller 7 comprises receiving means 8 for receiving the request 6. Upon reception of the request 6, the central admission controller 7 uses resource determining means 9 for determining if sufficient resources for establishing a new multicast channel between the source 3 and the second host system 5*b* can be established. For this purpose, the resource determining means 9 first determine the nodes and interconnecting links in the communications network 1' on which the requested multicast channel has to be established. In the present case, there are the three nodes 1-1 to 3-1 and the corresponding communication links 1.1 to 3.1, T2 which need to be crossed by the new multicast channel 4*b*.

In a subsequent step, the resource determining means 9 determines if sufficient resources exist on the nodes 1-1 to 3-1 and interconnecting links 1.1 to 3.1, T2 to provide the requested multicast channel to an end user at the second host system 5*b*. The central admission controller 7 has full knowledge of the resources both of the interconnecting links 1.1 to 3.1, T2 and the nodes 1-1 to 3-1 of the multicast tree 2, i.e. it has knowledge for any given node 1-1 to 3-1 of the maximum number of multicast channels which can be handled by that node. Moreover, the central admission controller 7 has full knowledge of the maximum number of multicast channels which can be transmitted over the respective links 1.1 to 3.1, T2 between the source 3, the nodes 1-1 to 3-1, and the second host system 5*b*.

If the resource determining means 9 determines that sufficient resources exist, a replication rule installation means 10 uses enforcement (see arrows 11) to install a replication rule for the new multicast channel 4*b* in parallel on each of the three nodes 1-1 to 3-1 in the path from the source 3 to the second host system 5*b*. As a result, the new multicast channel 4*b* will be established between the two of them, and the multicast admission control process is finished.

Figure 2B:
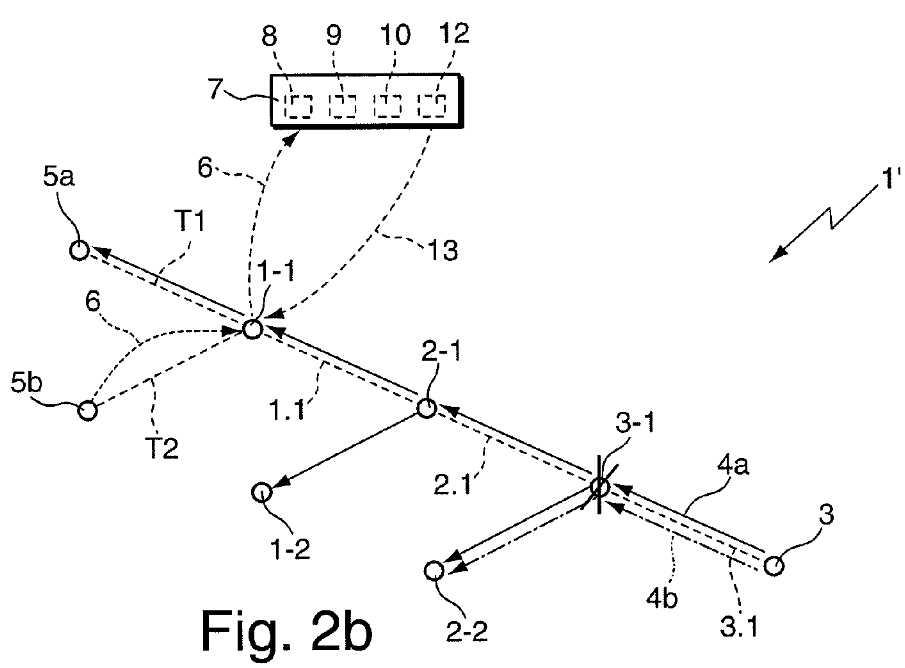

In case that the existing resources are insufficient, e.g. in case that the interconnecting link 2.1 between the second node 2-1 and the third node 3-1 has just enough capacity for the first multicast channel 4*a* (as shown in FIG. 2*b*), the resource determination means 9 notifies this to a denial of service generating means 12 of the central admission controller 7 which generates a denial of service message 13 which is sent to the first node 1-1 which notifies the second host system 5*b* that the new multicast link 4*b* cannot be established.

Using the central admission controller 7, the request 6 for a new multicast channel does not need to be propagated from the first node 1-1 to the second node 2-1 and the third node 3-1 in the multicast tree 2. Furthermore, potential problems can be detected immediately and notification can be made to the host systems in the communications network 1' very quickly, thus enhancing quality of service of the communications network 1'.

The solution described above makes use of Central Admission Control which is scalable, i.e. there is no considerable increase of the time for performing multicast admission control when the number of users in a communications network increases. Nevertheless, the first node 1-1 may also perform Local Admission Control, i.e. checking if the downstream link T2 to the host system 5*b* and the first node 1-1 itself have sufficient capacity to support the new multicast channel 4*b*. If this is the case, the request 6 to the central admission controller 7 will be sent, otherwise a denial of service message is sent directly to the second host system 5*b*.

The invention claimed is:

1. A method of performing multicast admission control in a communications network, comprising:

receiving, at a first node of a multicast tree of the communications network, a request for a multicast channel from a host system communicatively coupled to the first node;

sending, by the first node, a request for a multicast channel to a central admission controller of the communications network, the sending of the request being triggered by receiving the request from the host system;

determining, by the central admission controller, if sufficient resources exist on nodes and interconnecting links of the multicast tree of the communications network to provide the requested multicast channel from a source to the host system; and replicating the multicast channel on the nodes having sufficient resources to provide the requested multicast channel to the host system, if the determining step determines that sufficient resources exists, wherein the requested multicast channel is replicated in parallel to the multicast channel on the nodes.

2. The method according to claim 1, wherein the determining step determines the nodes and interconnecting links in the communications network on which the requested multicast channel has to be established.

3. The method according to claim 1, further comprising:

transmitting a denial of service message from the central admission controller to the first node if the determining step determines that existing resources are insufficient.

4. The method according to claim 1, further comprising:

generating, by the host system, a request for a multicast channel received by the first node.

5. The method according to claim 1, wherein the nodes of the multicast tree are serially connected.

6. A central admission controller for performing multicast admission control in a communications network, comprising:

a receiver configured to receive a request for a multicast channel sent from a first node of a multicast tree of the communications network, and the request is transmitted from a host system to the first node, a resource determiner configured to determine if sufficient resources exist on nodes and interconnecting links of the multicast tree of the communications network to provide the requested multicast channel from a source to the host system communicatively coupled to the first node, and a replicator configured to replicate the multicast channel on the nodes having sufficient resources to provide the requested multicast channel to the host system, and the replicator is configured to replicate the requested multicast channel in parallel to the multicast channel on the nodes.

7. The central admission controller according to claim 6, wherein the resource determiner is configured to determine the nodes and interconnecting links in the communications network on which the requested multicast channel is established.

8. The central admission controller according to claim 6, further comprising:

a denial of service generator configured to generate a denial of service message to be sent to the first node if the resource determiner determines that existing resources are insufficient.

* * * * *